July 28, 1970 H. SCHONEMEYER ET AL 3,522,387

CIRCUIT ARRANGEMENT TO CONTROL A NUMBER OF FUNCTIONAL UNITS HAVING A CENTRAL LOGIC IN COMMON

Filed June 15, 1967 2 Sheets-Sheet 1

INVENTOR
H. SCHONEMEYER
H. D SIEBEL

BY D. O. Warner

ATTORNEY

July 28, 1970 H. SCHONEMEYER ET AL 3,522,387

CIRCUIT ARRANGEMENT TO CONTROL A NUMBER OF FUNCTIONAL UNITS HAVING A CENTRAL LOGIC IN COMMON

Filed June 15, 1967 2 Sheets-Sheet 2

3,522,387

CIRCUIT ARRANGEMENT TO CONTROL A NUMBER OF FUNCTIONAL UNITS HAVING A CENTRAL LOGIC IN COMMON

Hilmar Schonemeyer, Ditzingen, and Hans-Dieter Seibel, Munchingen, Germany, assignors to International Standard Electric Corporation, New York, N.Y., a corporation of Delaware Filed June 15, 1967, Ser. No. 646,247
Claims priority, application Germany, June 24, 1966, St 25,576
Int. Cl. H04q 3/54
U.S. Cl. 179—18 5 Claims

ABSTRACT OF THE DISCLOSURE

Relates to central control of a switching system. A central logic is employed to provide control of a large number of junctors. The junctors are divided into groups, group storage is provided for each group and one junctor is activated per cycle. Each group scanning cycle is started with a different junctor.

Figure 1:
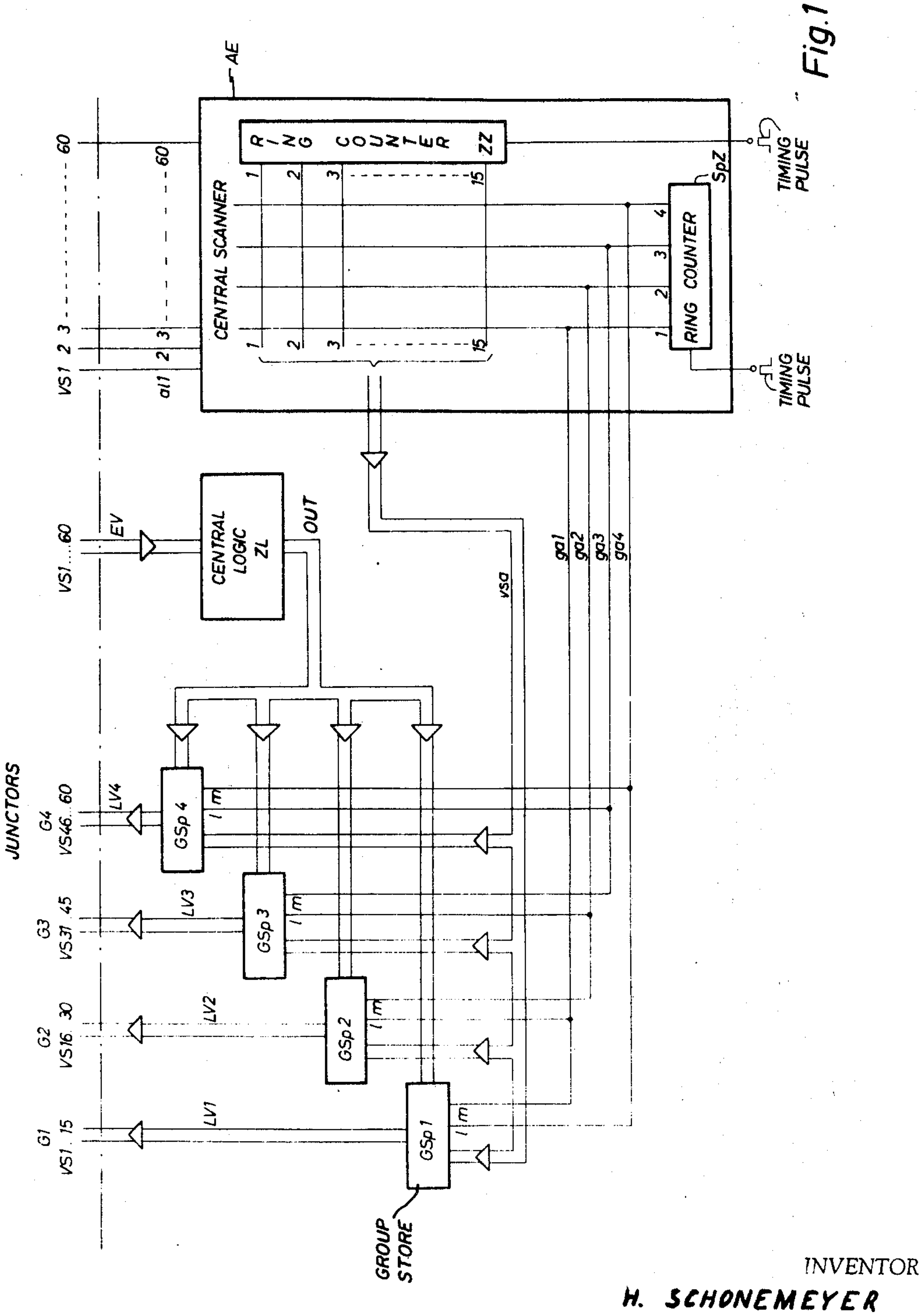

The invention relates to a circuit arrangement to control a number of functional units, having a central logic shared in common which obtained through a cyclically operating scanner information items referring to the operating condition of an individual functional unit, therefrom deriving control information items, if so required, to set the switching elements of the corresponding functional unit, in telecommunication and particularly telephone exchange systems.

In exchange systems, and particularly telephone exchange systems with centrally controlled crosspoint arrangements, all connections are established through so-called junctors which may be relay sets. The tasks such junctors have to perform are very numerous and require complicated logical intermeshings of the switching means, consequently, each junctor requires a considerable expenditure for equipment.

This disadvantage is avoided by an arrangement, shown in the U.S. Pat. No. 3,242,265, in which a central logic is pre-assigned to a number of junctors. The junctors themselves as a consequence include only a few switching means, serving to receive and to forward criteria being on the line. A store is associated with each junctor in which the information items are stored referring to how far a connection has been established in which this junctor participates. A scanner cyclically scans the individual junctors simultaneously with the storages thereto associated and transmits the information items scanned to the central logic. From these information items the central logic derives control commands and, moreover, sets the storage to a new position, if so required. In this arrangement it is a disadvantage that there are still required a storage means for each junctor.

The patent application St 24,713 VIIIa/21a3 (H. Heitmann) proposes, for a further reduction in equipment requirements, to investigate, via a scanner during its setting period to a junctor, in a first part time the switching condition of the individual switching elements and the prevailing conditions on the connecting lines to said junctor and to transfer corresponding information items to an in put store of the central logic. This central logic works out control commands from the information items in the input storage, if so required, to set the switching elements of the addressed junctor and sets these switching elements during a second period of time.

In order to obtain an admissible duration of the cycle by the above described means, either the number of junctors must be low or the setting of the scanner to a junctor must be short. However, the number of junctors is determined by theoretical considerations of telephone traffic and the duration of setting to a junctor is primarily determined by the responding time of the switching elements to be set of such an addressed junctor. When using a relay this responding time is relatively long.

Another solution would be to provide other storages, e.g. quickly operating electronic storage means in the junctors to receive the setting information items, but this solution requires a considerable expenditure.

It is the primary object of the present invention to avoid the aforementioned disadvantages.

This objective is achieved, according to the invention when the functional units are subdivided into groups. A group store is associated with each group which comprises individual partial store for each of the control information items derived by the central logic for a functional unit. The scanner scans the functional units in compliance with their subdivision into groups, conditions only the group store associated to the just addressed group for receiving control information items from the central logic and indicates to this group store the identity of the respectively addressed functional unit. A group store, after receiving a control information, is blocked for the remaining scanning cycle and transfers during this period the stored control information items to the functional unit concerned.

The circuit arrangement according to the invention thus permits a short time for setting of the scanner to a functional unit without higher requirements in the setting time of the switching elements of the individual functional units and without requiring storage means for each junctor.

Figure 2:
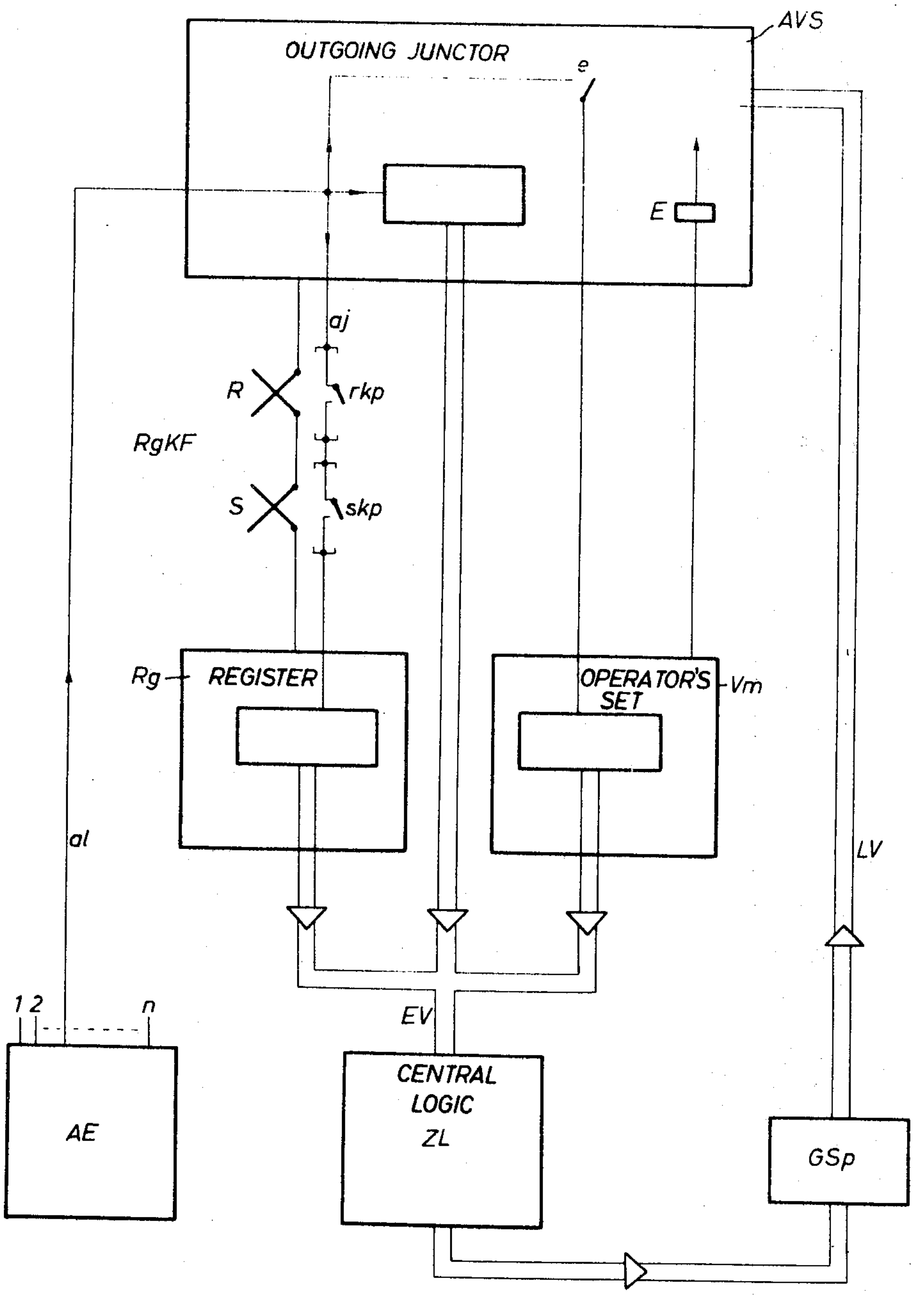

The invention, as well as its further features, are explained in detail with the aid of the accompanying drawings, wherein:

FIG. 1 shows a functional block diagram of a preferred embodiment according to the invention, and FIG. 2 shows a block diagram of a modification of the arrangement shown in FIG. 1.

VS1 . . . 15, VS16 . . . 30, VS31 . . . 45 and VS46 . . . 60 as well as VS1 . . . 60 shown in FIG. 1 indicate 60 functional units, not shown in detail, e.g. the junctors are subdivided into four groups, G1 . . . G4, each group comprising 15 junctors. A group-store GSp1 . . . GSp4, one of which is associated with each group, contains a partial store for each control command to be transmitted to the junctors connected. The outputs of a store actuate all junctors of the associated group in the multiple. Consequently, the storage means are provided only once for each group of junctors. A central scanner AE cyclically scans the junctors. This scanner consists of a matrix with one column per group of junctors and one line per junctor within a group, in our example: four columns (1–4) and 15 rows (1–15). Each crosspoint of said matrix forms the scanning point for a junctor. Two ring-counters SpZ and ZZ, each controlled by a timing pulse, operate rows and columns of the matrix. The position of the counter SpZ determines the group of junctors, the position of the counter ZZ determines the junctor within such a group.

The junctors always are scanned first within a group being then advanced to the following group by the counter SpZ. This advancement to the next group is not performed immediately after the row counter ZZ has passed through the group once, but some scanning pulses later. It is thereby assured that scanning within a group starts during each scanning cycle with a different junctor, because the ring counter ZZ is, after each switching over from one group to another, placed in another starting position, thus avoiding that any junctor of the group is impaired due to its arrangement within said group. The respective crosspoint of the matrix, marked by the coinciding information of both ring counters releases, through scanning lines *al*1 . . . 60 in the pertaining junctor, the input multiple EV of the central logic ZL, which central logic decides whether setting commands have to change the operative condition of said junctor.

During one pulse, applied to a row of said matrix, the central logic ZL receives input information from each scanned junctor, forms out of said information the corresponding switching commands, if the operative condition of said junctor is to be changed, and forwards these commands in parallel to all group-stores $GS_p$, storing them in the group storage $GS_p$ associated with the group of the scanned junctor. This group store $GS_p$ is made available for receiving information items by the position of the counter S*p*Z. The position of counter ZZ is stored in the group storage $GS_p$, thus identifying the junctor to be actuated by said counter. Immediately after storing the information items thus still during the scanning pulse, the group storage $GS_p$ is blocked against further information items within the just performed scanning cycle. The following storage within said cycle can therefore be carried out only during the scanning of the succeeding group of junctors. The next following storage within the same group is performed only during the next following scanning cycle. The blockcd group-store $GS_p$ is then released again and its contents cancelled, when the counter $S_pA$ marks the group store of the immediately preceding group with the aid of the group switch-over.

Assume, as initial conditions that none of the group-stores contains information, that the counter ZZ is at the position 10, and that the conuter S*p*Z is at the position 1. By means of a scanner positioned at the crosspoint between the tenth row and the first column, the junctor VS10 is initiated via the scanning line *a*1–10 to transfer its information contents to the central logic ZL via the input multiple EV.

This central logic thus receives information items on the present condition of the switching elements of the junctor VS10 and on the conditions prevailing on the connecting lines of said junctor VS10 (presence or absence of current, voltage, etc.). The central logic ZL processes these information items in an arbitrary and well known way, e.g. with the aid of a translator, and forwards through its output the probably derived setting information items for the switching elements of the junctor VS10 to all group-stores GS*p*1/GS*p*4. Corresponding to the position of the counter S*p*Z only the group-store GS*p*1 is available to receive information items over the group-address wire GA1. This group-store GS*p*1 comprises a partial storage each for every second information that can be forwarded to said group-store from the central logic ZL, and a partial storage in which the present position of the counter ZZ is stored (over the information channel *vsa*). In a way not shown in detail, the group storage is blocked against further information forwarded to it after the previous information has been stored and still before the counter ZZ advances to its next position 11. That means that setting information items derived for one of the junctors of the group G1 following in the cycle are not stored. However, each of the group-stores GS*p*2/GS*p*4 may receive and store setting information items which the central logic Z1 derives for a junctor of the associated group G2, G3, or G4.

During scanning of the other junctors of the group G1 as well as the junctors of the groups G2 and G3 the group storage GS*p*1 forwards the stored setting information items to the junctor VS10 with which it is connected via the line multiple LV1, associated in common to the junctors VS1/VS15 and via a crosspoint element (not shown on the drawing) set with the aid of the stored position of counter ZZ. The switching elements of the junctor, which may comprise relays for example, transit into their new switching positions and the contents of the group-store GS*p*1 is cancelled during the scanning of the junctors of the group G4, i.e. in position 4 of the counter S*p*Z, via the wire G*a*4. The blocking period of a group-store is for *n* groups (*n*—2) times the scanning period of a group at a minimum, because during the scanning of the immediately preceding group the own store contents are cancelled, but, in the most unfavourable case, new information arrives from the last junctor of the own group. If a junctor of the collective group is connected during its function with other devices, e.g. an outgoing junctor AVS of a PABX is connected with a register or with the operator's set, these facilities too may be interrogated by the central logic ZL in an advantageous manner, if these information items cause changes in the switching condition of the junctor.

FIG. 2 shows such an arrangement. The scanning pulse not only scans the outgoing junctor AVS, but, via a wire *aj* of the register-connector R*g*KF, also a register RG connected to it, or, via a contact *e* of the operator's connector E, the operator's set V*m*, connected thereto. The data or both facilities form, together with the data of the outgoing junctor AVS, the input information of the central logic ZL. All other functions are the same as described for FIG. 1 and need, therefore, no further explanation. The rectangular blocks of the circuit diagram in FIG. 2, designated with AVS, R*g* and V*m*, represent the switching elements of these functional units symbolically.

While the principles of the invention have been described above in connection with specific apparatus and applications, it is to be understood that this description is made only by way of example and not as a limitation on the scope of the invention.

What is claimed is:

1. A circuit arrangement for use in telecommunication systems, and particularly telephone exchange systems, to control a number of functional units having a common central logic which receives through a cyclically operating scanner the respective information items referring to the operative condition of an individual functional unit and which therefrom derives, as required, control information items to set the switching elements of the functional unit concerned, wherein the improvement comprises:
functional units subdivided into groups,
a group-store associated with each corresponding group, said group-store providing storage for control information derived by a central logic for a functional unit,
a scanner to scan the functional units according to their subdivision into groups and to condition only one group-store at a time to receive control information items from the central logic,
said scanner indicating to said group-store the identity of the respective functional unit addressed and that the group-store is blocked for the remaining period of the scanning cycle after having received control information, and
said group-store forwarding said stored control information items during said period to the function unit concerned.

2. A circuit arrangement according to claim 1, in which:
the central logic simultaneously transmits a control command to all group-stores and only the group-store conditioned by the scanner stores the control command, together with the identity of a functional unit within the group concerned, and
said group store has access to the functional unit concerned with the aid of the store identity information through settable connecting elements.

3. A circuit arrangement according to claim 1, in which: the information items stored in a group-store, associated with a group are cancelled during scanning of the group preceding the first mentioned group.

4. A circuit arrangement according to claim 1, in which: scanning within a group starts, for each scanning cycle, at another functional unit.

5. A circuit arrangement according to claim 1, in which: simultaneously with the scanning of the switching condition of a functional unit addressed by the scanner, the condition of a functional unit connected to said first mentioned functional unit can be scanned through a separate wire or contact of the connectors of both functional units.

References Cited

UNITED STATES PATENTS 3,133,267 5/1964 White -------------- 340—147

WILLIAM C. COOPER, Primary Examiner

U.S. Cl. X.R.

340—147